US009385523B2

(12) United States Patent
Freitag et al.

(10) Patent No.: US 9,385,523 B2
(45) Date of Patent: Jul. 5, 2016

(54) CIRCUIT ARRANGEMENT HAVING AN EMERGENCY STOP SWITCH OF A HOIST

(75) Inventors: Holger Freitag, Bochum (DE); Giorgio Maccioni, Witten (DE); Giuliano Persico, Wetter (DE)

(73) Assignee: Terex MHPS IP Management GmbH, Duesseldorf (DE)

( * ) Notice: Subject to any disclaimer, the term of this patent is extended or adjusted under 35 U.S.C. 154(b) by 601 days.

(21) Appl. No.: 13/884,315

(22) PCT Filed: Nov. 9, 2011

(86) PCT No.: PCT/EP2011/069757
§ 371 (c)(1),
(2), (4) Date: May 9, 2013

(87) PCT Pub. No.: WO2012/062811
PCT Pub. Date: May 18, 2012

(65) Prior Publication Data
US 2013/0229069 A1 Sep. 5, 2013

(30) Foreign Application Priority Data
Nov. 11, 2010 (DE) .......................... 10 2010 060 506

(51) Int. Cl.
*H02H 7/00* (2006.01)
*G05B 9/02* (2006.01)
(52) U.S. Cl.
CPC .. *H02H 7/00* (2013.01); *G05B 9/02* (2013.01); *Y10T 307/826* (2015.04)
(58) Field of Classification Search
CPC .................................... H02H 7/00; B61B 3/00
See application file for complete search history.

(56) References Cited

U.S. PATENT DOCUMENTS 3,463,327 A * 8/1969 Lester ..................... B66C 13/40
212/285
5,329,468 A * 7/1994 Tsukahara ........... G01R 21/133
318/569

FOREIGN PATENT DOCUMENTS

DE 19962497 A1 7/2001
EP 1380533 B1 4/2006

OTHER PUBLICATIONS

International Search Report and Written Opinion of the International Searching Authority from corresponding Patent Cooperation Treaty (PCT) Application No. PCT/EP2011/069757, mailed Feb. 6, 2012.
German language International Preliminary Report on Patentability from corresponding Patent Cooperation Treaty (PCT) Application No. PCT/EP2011/069757 mailed Nov. 6, 2012.

* cited by examiner

*Primary Examiner* — Kenneth B Wells
*Assistant Examiner* — Rafael Pacheco
(74) *Attorney, Agent, or Firm* — Gardner, Linn, Burkhart & Flory, LLP

(57) ABSTRACT

The invention relates to a circuit arrangement comprising a hoist controller (12) of a hoist (10), a control pendant (12) having an emergency stop switch (2), and a control line (3) which electrically connects the hoist controller (12) to the control pendant (12) and has a control voltage applied thereto. In order to provide a circuit arrangement for monitoring an emergency stop switch of a hoist having a pendant switch, which circuit arrangement can be used to reliably detect a short circuit, it is proposed to assign a controller (1) to the emergency stop switch (2), which controller superimposes a cyclical pulse on the control voltage, and to design the hoist controller (12) in such a manner that said hoist controller monitors the cyclical pulse and switches the hoist (10) to a safe state in the absence of the cyclical pulse.

20 Claims, 4 Drawing Sheets

CIRCUIT ARRANGEMENT HAVING AN EMERGENCY STOP SWITCH OF A HOIST

CROSS REFERENCE TO RELATED APPLICATION

The present application claims the priority benefits of International Patent Application No. PCT/EP2011/069757, filed on Nov. 9, 2011, which is hereby incorporated herein by reference in its entirety.

BACKGROUND OF THE INVENTION

The invention relates to a circuit arrangement comprising a hoist controller of a hoist, a pendant control switch having an emergency stop switch, and a control line which electrically connects the hoist controller to the pendant control switch and which has a control voltage applied thereto.

An emergency shutdown switch (also referred to as emergency shutdown) and an emergency stop switch (also referred to as emergency stop) are specific switches on machines, vehicles and installations, in order to rapidly put them in a safe state when a hazardous situation arises or to avert such a hazardous situation. Depending upon the field of application, various strategies are pursued, in the simplest case the activation is followed by an interruption in the supply of current. These switches have a red actuating element on a yellow base. Mushroom buttons are the most common design, in the case of large installations such as e.g. conveying systems trigger line switches (pull cord switches) are also typical.

Switching devices or controls which satisfy the necessary requirements of reliability and further safety aspects are typically used together with emergency shutdown or emergency stop switches, and therefore for instance after an emergency stop a machine must not start up again automatically and in any case all of the components must not be switched off. Depending upon technical conditions, emergency stop switches are classified into stop categories (pursuant to EN 60204-1: safety of machines—electrical equipment of machines—general requirements). A distinction is made between stop categories 0, 1 and 2. In stop category 0, the supply of energy to the drive elements is fully disrupted, if the sudden switching-off of the energy does not cause a hazard. In the case of stop category 1, shut-down is controlled. The machine is put in a safe state and only then is the energy to the drive elements fully disrupted. This is practical if devices such as clamps or brakes require energy to function. In the case of stop category 2, the machine is put in a safe state, but the energy is not disrupted. This category should only be used if from a technical point of view it is not possible to cut off the energy safely. For example, in the case of a crane having a lifting magnet, switching off the voltage at the magnet would cause the load to fall.

In contrast to the emergency shutdown, in the case of the emergency stop it is not necessary for the entire machine to have its energy supply cut off, but rather when a dangerous situation is detected a drive must be stopped in order to protect against any danger.

Therefore, problems are caused by a short-circuit of the emergency shutdown switch or emergency stop switch itself or a short-circuit (also referred to as cross-circuit or interwire short) in the associated wire lines. Short-circuits of this type would short-out the emergency shutdown switch or emergency stop switch and thus prevent a protective function in the event of an emergency. Therefore, it is important that a short-circuit is discovered in good time and in a reliable manner.

Some known options for reducing the probability of cross-circuits or interwire short-circuits are fixed, protected and/or separate routing of the wire lines (e.g. by routing them in cable channels or armoured conduits or the use of different sheathed lines). It is thus possible to assume a fault exclusion for short-circuits between the conductors (EN ISO 13849-2-appendix D.5.2).

The aforementioned measures are not practical for hoists having a pendant switch: the control line between the control switch suspended at operator-height and the hoist or crane—typically at the height of the hall—is subjected to strong tensile forces and vigorous movements as a consequence of usage, so that in this case a fault exclusion for short-circuits between the conductors is not readily possible in this manner.

Further known devices, such as e.g. by the company Pilz, have a consumer, e.g. a resistor in series with the switch, so that a lowering of the voltage occurs, the sources of which are monitored for discovering a cross-circuit. Alternatively, it is also known from the company Pilz to switch off the voltage supply to the two channels of a two-channel switch in staggered fashion for several milliseconds and to check the inputs to see if a voltage is present, which indicates a cross-circuit.

A circuit arrangement for the safe switching-off of a machine installation is already known from German laid-open specification DE 199 62 497 A1. The circuit arrangement includes essentially a signal unit, such as e.g. a light barrier or an emergency shutdown button which is connected to a safety switching device via an electrical line. The safety switching device monitors the operating state of the machine installation. This includes e.g. state variables of the machine installation, such as the position of the emergency shutdown button, the open and closed position of a protection door or the state signal of a light barrier. A safe state is achieved in this case by switching off the supply of current to the machine installation. In order to ensure that the safety switching device can perform a self-test of its signal paths independently of the signal unit used, it is provided that a periodic clock signal is superimposed upon the output signal of the signal unit within the safety switching device between an input stage and an evaluation and switch-off unit. In the evaluation and switch-off unit, this clock signal can then be filtered out and defective cross-circuits can be established within the safety switching device.

European patent application EP 1 380 533 A1 discloses a circuit arrangement for controlling a crane. The circuit arrangement includes a crane control, which is based upon a bidirectional data bus, and a pendant control switch having an emergency stop switch. The pendant control switch is electrically connected to the crane control via a control line.

SUMMARY OF THE INVENTION

The present invention provides a circuit arrangement for monitoring an emergency stop switch of a hoist having a pendant switch, by means of which a short-circuit can be detected in a reliable manner.

A circuit arrangement, according to an aspect of the invention, includes a hoist controller of a hoist, a pendant control switch having an emergency stop switch, and a control line which electrically connects the hoist controller to the pendant control switch and which has a control voltage applied thereto. Reliable short-circuit detection is achieved in the region of the control line and of the emergency stop switch by virtue of the fact that the emergency stop switch is allocated another controller which superimposes a cyclical pulse upon the control voltage and is disposed in a housing of the pendant control switch, and the hoist controller is configured such that it monitors the cyclical pulse and switches the hoist to a safe state in the event that the cyclical pulse does not occur. The circuit arrangement in accordance with this aspect of the invention increases the safety of pendant control switches of hoists, of which the control line which is suspended from the respective hoist is subjected to extensive mechanical loading during operation of the hoist. Specifically in this control line, line breakages of the individual wires of the control line can occur. The circuit arrangement in accordance with this aspect of the invention renders it possible to reliably detect a short-circuit of the emergency stop switch and the transfer of voltage to involved wires of the control line. Therefore, a correspondingly operated circuit arrangement is suitable for high risk groups, in which fault detection is required. The closed state, i.e. the non-actuated state of the emergency stop switch is thus monitored for short-circuits. The open emergency stop switch leads in any event to a safe state.

The emergency stop switch is thus connected to the hoist controller via a control line and the control line has a control voltage applied thereto, so that in the event of a change of the switch position of the emergency stop switch (closed to open or vice versa) the hoist controller detects the change in the control voltage and triggers a function, e.g. activates a power switch such as a relay or a contactor (which can switch several kW of power), in order to shut down the hoist or switch off the current.

In order to ensure that this also functions in a problem-free manner or a short-circuit which adversely affects the function of the emergency stop switch is detected, a controller located in the emergency stop switch is used for modulating a pulse into the control voltage, the presence (or absence) of which pulse is monitored on the controller side by the hoist controller. If it is established by the hoist controller that the pulse is absent, then it is clear that the pulse generator has been bridged and that there is a short-circuit of the emergency stop switch or of the control line, such that the function thereof is not guaranteed.

The hoist controller may be connected to a power switch which is controlled directly via the control voltage. The cyclical pulse may be generated by means of the control voltage itself, i.e., no load is used which lowers the voltage. By virtue of the cyclical control voltage modification, practically no power is consumed. Therefore, the control voltage can also be used directly as a control voltage of a power switch, such as relay or a contactor. This simplifies the structure of the complete circuit arrangement and also permits backwards compatibility with older circuit arrangements.

The pulse width may be selected to be so small that practically no power drop can be noticed and it remains possible to directly actuate a relay or a contactor for adopting the safety emergency stop state. In the illustrated embodiment, the pulse width is less than 5 ms, and may be between 2 and 4 ms.

The term "relay" is understood to mean a remotely actuated switch which is operated by electric current, functions mostly electromagnetically and has generally two switching positions. The relay is activated by a control current circuit (control voltage) and can switch further circuits. The term "contactor" is understood to be an electrically or pneumatically actuated switch or electronic switch for large powers, which is similar to a relay.

The controller may include a semiconductor switch and a logic unit for cyclical actuation of the semiconductor switch. In an expedient manner, the logic unit is a programmable controller (e.g. a microcontroller) which is programmed in order to effect monitoring of the presence of the pulse. A semiconductor switch which is formed as a photo-MOSFET relay has been shown quite specifically to be suitable for changing the control voltage. Photo-MOSFET relays are similar to optocouplers in terms of structure: they operate on the controller side like an optocoupler with an IR-LED and in contrast to "normal" semiconductor relays do not have on the load side any triacs or thyristors but rather MOSFETs, by means of which they can switch direct and alternating voltages at a typically rather low current. They do not have to be cooled and have at a low load current a lower voltage drop than semiconductor relays, but typically they have a higher "contact resistance" than mechanical signal relays. They operate in a bounce-free and wear-free manner and at high switching speeds (several milliseconds) which in specific embodiments can achieve switching frequencies of up to 100 kHz.

In order to use the illustrated controller with an alternating voltage-control voltage, the controller is formed in such a manner that the cyclical pulse is generated by periodically cutting out a part of the control voltage. In the case of a direct voltage-control voltage, the controller is formed in such a manner that in the case of a direct voltage-control voltage the cyclical pulse is generated by periodically switching off the control voltage for a short period of time.

In the case of an alternating voltage-control voltage (AC), the cyclical pulse can be generated by means of a power semiconductor, in particular a thyristor, by phase cutting—periodically cutting out a part of the control voltage—or in the case of a direct voltage-control voltage (DC), the cyclical pulse can be generated by means of a power semiconductor by periodically switching off the control voltage for a short period of time.

The controller may be connected in series with the emergency stop switch in the control line and generates the pulse from the control voltage. Alternatively, a reference voltage could also be used.

In an advantageous manner, the controller for pulse generation is disposed in a housing of the emergency stop switch. Therefore, on the basis of the pendant control switch beginning with the emergency stop switch the subsequent entire control line right through to the hoist controller can be monitored, since it is only at this location that the presence of the pulse is monitored and a short-circuit in the emergency stop switch and the control line is detected.

Since the short-circuit monitoring device performs short-circuit monitoring via the cyclical pulse with minimised voltage losses, it is expedient if the controller is connected to a relay or contactor which is controlled directly via the control voltage.

BRIEF DESCRIPTION OF THE DRAWINGS

Further details, features and advantages of the invention are apparent from the description hereinafter of an exemplified embodiment with reference to the drawing, in which.

DETAILED DESCRIPTION OF THE PREFERRED EMBODIMENT

Figure 1:
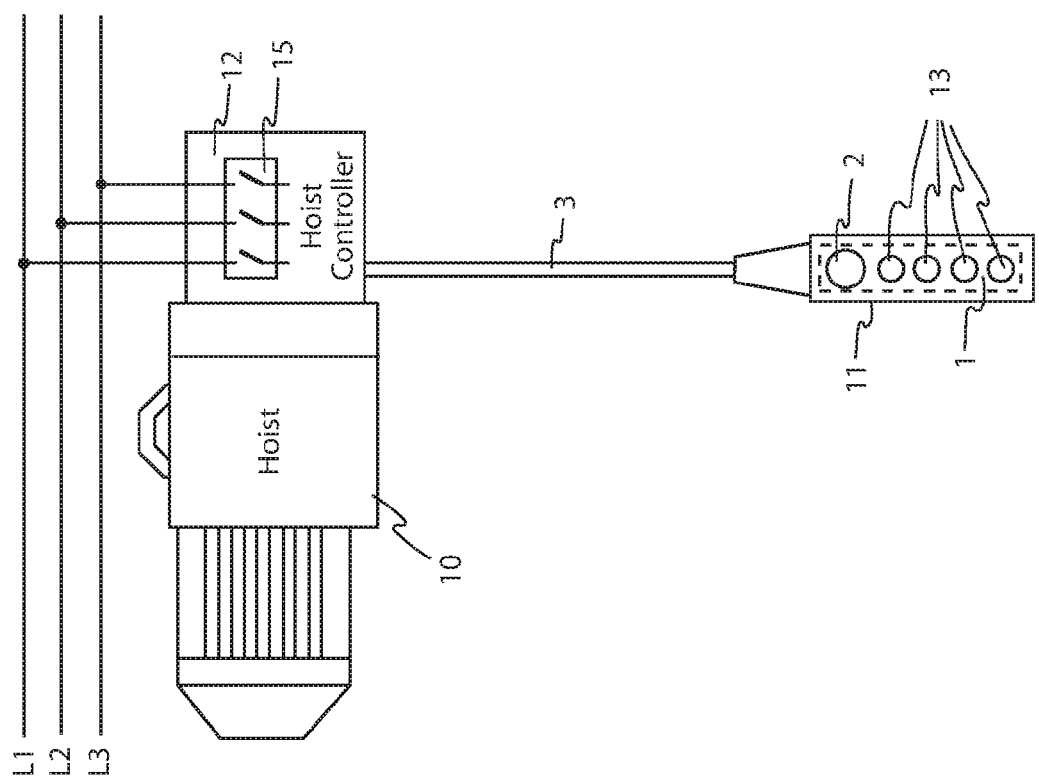
FIG. 1 shows schematically a hoist having a pendant control switch.

FIG. 1 shows schematically a hoist 10 which is formed as a chain block and from which a pendant control switch 11 is suspended via a control line 3. The control line 3 is electrically connected in the hoist 10 to a hoist controller 12 which is illustrated only schematically and by means of which the control and safety signals of the pendant control switch 11 are relayed to drives of the hoist 10. For this purpose, the control line 3 has a control voltage applied thereto. In the region of the pendant control switch 11, the control line 3 is electrically connected to a controller 1 which monitors the control line 3 for short-circuits. The pendant control switch 11 has several switching elements 13 which protrude on its front side with actuating tappets, are disposed vertically one above the other and by means of which the lifting and lowering movements and e.g. travel movements of the hoist 10 can be controlled. In addition, an emergency stop switch 2 is typically disposed at the uppermost position in the pendant control switch 11. Moreover, the hoist controller 12 is configured such that a change in the switch position of the emergency stop switch 2 or of the other switching elements 13 is detected and a corresponding function is triggered, such as e.g. effecting a safe emergency stop when the emergency stop switch 2 is open or effecting an actuation of the corresponding drives when switching elements 13 are actuated.

Figure 2:
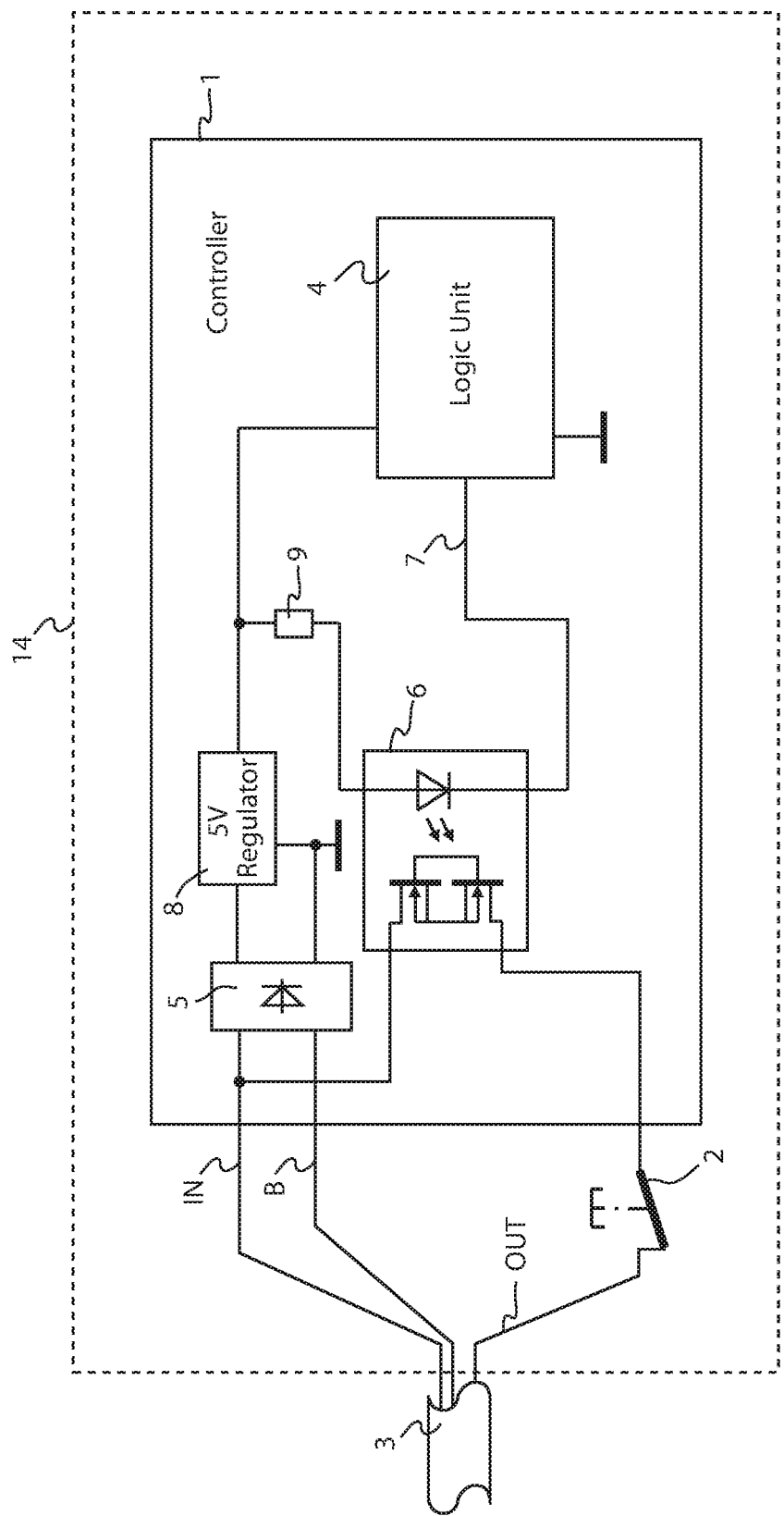
FIG. 2 shows schematically a controller of a short-circuit monitoring device.

The controller 1 for short-circuit monitoring is disposed in a housing 14 of the pendant control switch 11 emergency stop switch 2 and is designated in FIG. 2 schematically as a whole by the reference numeral 1. Alternatively, the controller 1 can also be disposed in a housing of the emergency stop switch 2. In this Figure, the emergency stop switch 2 is indicated in a schematically simplified manner as a switching symbol and the housing 14 is indicated as a frame 14. The controller 1 generates a cyclical pulse in the control voltage, so that the control voltage is changed in order to include a pulse. This generated pulse is monitored by the hoist controller 12, in order to discover a short-circuit.

If the pulse, coming from the controller 1, cannot be detected at the input of the hoist controller 12, even though there is a control voltage applied to the control line 3, then it is clear that the controller 1 has been bridged at the end of the path of the control line 3 or of the emergency stop switch 2 and therefore a short-circuit is present.

Figure 3:
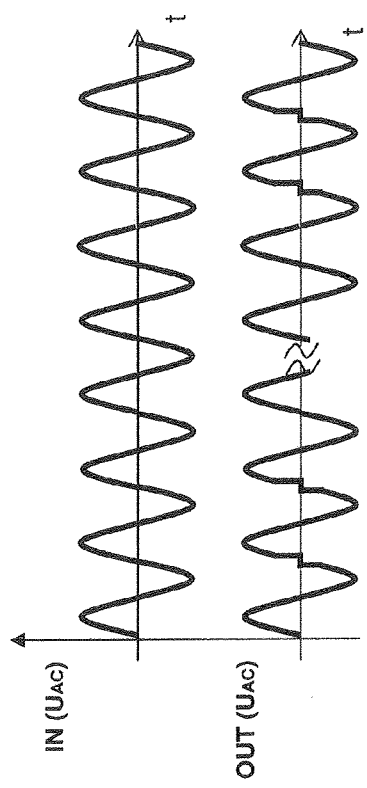
FIG. 3 shows a schematic diagram of the alternating voltage progression when the controller of FIG. 2 is used.
Figure 4:
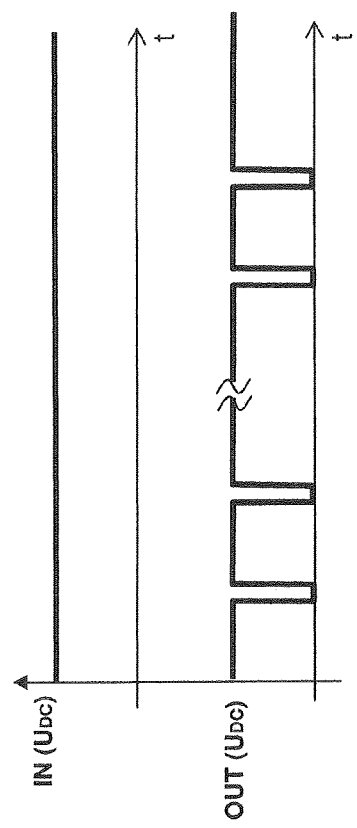
FIG. 4 shows a schematic diagram of the direct voltage progression when the controller of FIG. 2 is used.

The diagrams of FIGS. 2 and 3 show by way of example the resulting voltage progressions for an alternating control voltage $U_{AC}$ (FIG. 2) and a direct control voltage $U_{DC}$ (FIG. 3) over time t at the input IN and the output OUT.

The controller 1 includes two inputs IN and B and one output OUT which are connected to the hoist controller 12 via the control line 3. The actual emergency stop switch 2 is disposed in the output OUT.

The control voltage is applied to the controller 1 via the input IN, whereas the input B (reference) supplies the controller 1 with a control voltage for a logic unit 4 in the controller 1 which passes from a 5V regulator 8 to the logic unit 4. The logic unit 4 is formed e.g. as a microcontroller or timer.

Since the controller 1 can operated optionally by direct or alternating voltage, the conversion of the control voltage into a direct voltage takes place where appropriate after the input of the control voltage via the input IN initially in a rectifier 5 connected downstream, and input into the logic unit 4 takes place.

In parallel, the control voltage is directed from the input IN via a semiconductor switch 6 to the output OUT or the emergency stop switch 2. The semiconductor switch 6 is formed preferably as a photo-MOSFET relay.

In the semiconductor switch 6, the cyclical pulse in the case of an alternating voltage-control voltage (AC) is generated by periodically cutting out a part of the control voltage or the cyclical pulse in the case of a direct voltage-control voltage (DC) is generated by periodically switching off the control voltage therefrom for a short time. The pulse within the control voltage is thus generated in both cases by a change in the control voltage.

To this end, the semiconductor switch 6 or the diode part thereof has a signal voltage applied to it by the logic unit 4, for which reason an output 7 of the logic unit 4 is connected to the input of the diode part of the semiconductor switch 6. The second terminal of the diode part of the semiconductor switch 6 is connected to the voltage supply via a resistor 9. The resistor 9 limits the current applied to the diode part.

If there is a signal voltage applied to the diode part of the semiconductor switch 6, the relay 6 is closed and the control voltage is relayed from the input IN to the output OUT via the relay 6.

In contrast, if there is no signal voltage applied to the diode part of the semiconductor switch 6 because the logic unit 4 has deliberately switched off the signal, the control voltage is cut off or is not relayed.

This deliberate cutting off or switching off of the control voltage is effected cyclically in the case of an alternating voltage-control voltage (AC) by periodic cutting out at zero-crossing, so that as little energy or power as possible is lost (cf. FIG. 2). In the case of direct voltage-control voltage (DC), periodic short-time switching off is effected for several milliseconds (cf. FIG. 3).

When an alternating voltage-control voltage is applied, the logic unit 4 monitors the pulsing control voltage coming from the rectifier 5, in order to be able to determine the zero-crossing and to switch off the signal voltage in a coordinated manner, so that a control voltage is produced having a cyclical pulse at the output OUT (see FIG. 2).

When a direct voltage-control voltage is applied, the logic unit 4 cyclically switches off the signal voltage at the output 7, so that a control voltage is produced having a cyclical pulse at the output OUT (see FIG. 3). The direct voltage is detected via the uniform voltage progression at the input of the logic unit 4.

If the switch 2 or the control line 3 is short-circuited, the pulse is not present, and therefore the hoist controller 12 detects the absence of the pulse and can bring about a safe state of the hoist 10.

Since the controller 1 implements the cyclical pulse with minimised voltage losses, it is provided that the hoist controller 12 actuates a power switch 15, such as a relay or a contactor, directly via the control voltage. In this case, the pulse width is selected such that practically no power drop is noticeable and it remains possible to directly actuate a power switch 15 in order to adopt the safe emergency stop state. Preferably, the pulse width is less than 5 ms, preferably between 2 and 4 ms.

The above exemplified embodiment is related to short-circuit monitoring of the control line 3 and the emergency stop switch 2. By means of the circuit arrangement in accordance with the invention, it is essentially also possible to monitor emergency shutdown switches or other switching elements 13 of a pendant control switch 11 for short-circuits.

The invention claimed is:

1. Circuit arrangement, comprising:
   a hoist controller of a hoist, a pendant control switch having an emergency stop switch, and a control line which electrically connects the hoist controller to the pendant control switch and which has a control voltage applied thereto; and
   another controller associated with the emergency stop switch which superimposes a cyclical pulse upon the control voltage and is disposed in a housing of the pendant control switch, and the hoist controller is configured such that it monitors the cyclical pulse and switches the hoist to a safe state in the event that the cyclical pulse does not occur.

2. Circuit arrangement as claimed in claim 1, wherein the hoist controller is configured such that it detects a change in the position of the emergency stop switch and triggers a function of the hoist.

3. Circuit arrangement as claimed in claim 1 wherein said another controller is connected in series with the emergency stop switch in the control line and generates the pulse from the control voltage.

4. Circuit arrangement as claimed in claim 3, wherein said another controller generates the cyclical pulse in the case of an alternating voltage-control voltage by periodically cutting out a part of the control voltage.

5. Circuit arrangement as claimed in claim 3, wherein said another controller generates the cyclical pulse in the case of a direct voltage-control voltage by periodically switching off the control voltage for a short period of time.

6. Circuit arrangement as claimed in claim 1 wherein said another controller includes a semiconductor switch and a logic unit for cyclical actuation of the semiconductor switch.

7. Circuit arrangement as claimed in claim 1 wherein said hoist controller is connected to a power switch which is controlled directly via the control voltage.

8. Circuit arrangement as claimed claim 1 wherein said housing is for the emergency stop switch.

9. Circuit arrangement as claimed in claim 2 wherein said another controller is connected in series with the emergency stop switch in the control line and generates the pulse from the control voltage.

10. Circuit arrangement as claimed in claim 9, wherein said another controller generates the cyclical pulse in the case of an alternating voltage-control voltage by periodically cutting out a part of the control voltage.

11. Circuit arrangement as claimed in claim 9, wherein said another controller generates the cyclical pulse in the case of a direct voltage-control voltage by periodically switching off the control voltage for a short period of time.

12. Circuit arrangement as claimed in claim 2 wherein said another controller includes a semiconductor switch and a logic unit for cyclical actuation of the semiconductor switch.

13. Circuit arrangement as claimed in claim 3 wherein said another controller includes a semiconductor switch and a logic unit for cyclical actuation of the semiconductor switch.

14. Circuit arrangement as claimed in claim 4 wherein said another controller includes a semiconductor switch and a logic unit for cyclical actuation of the semiconductor switch.

15. Circuit arrangement as claimed in claim 5 wherein said another controller includes a semiconductor switch and a logic unit for cyclical actuation of the semiconductor switch.

16. Circuit arrangement as claimed in claim 2 wherein said hoist controller is connected to a power switch which is controlled directly via the control voltage.

17. Circuit arrangement as claimed in claim 3 wherein said hoist controller is connected to a power switch which is controlled directly via the control voltage.

18. Circuit arrangement as claimed in claim 4 wherein said hoist controller is connected to a power switch which is controlled directly via the control voltage.

19. Circuit arrangement as claimed in claim 5 wherein said hoist controller is connected to a power switch which is controlled directly via the control voltage.

20. Circuit arrangement as claimed in claim 6 wherein said hoist controller is connected to a power switch which is controlled directly via the control voltage.

\* \* \* \* \*